United States Patent [19]

Iannicelli et al.

[11] Patent Number: 4,552,735

[45] Date of Patent: Nov. 12, 1985

[54] PROCESS FOR REMOVING TOTAL REDUCED SULFUR COMPOUNDS FROM INDUSTRIAL GASES USING MANGANESE DIOXIDE

[75] Inventors: Joseph Iannicelli, Brunswick, Ga.; Leif D. Caspersen, Hørsholm; Jan M. Hansen, Lyngby; Jens C. T. Moller, Allerød, all of Denmark

[73] Assignee: Aquafine Corporation, Brunswick, Ga.

[21] Appl. No.: 486,672

[22] Filed: Apr. 20, 1983

[51] Int. Cl.⁴ ............................................. B01D 53/34
[52] U.S. Cl. ................................... 423/224; 423/230; 423/242
[58] Field of Search ...................... 423/224, 230, 242

[56] References Cited

U.S. PATENT DOCUMENTS

| | | | |
|---|---|---|---|
| 2,984,545 | 5/1961 | Tarbutton et al. | 23/178 |
| 3,150,923 | 9/1964 | Bienstock et al. | 23/2 |
| 3,492,083 | 1/1970 | Lowicki et al. | 423/244 |
| 4,002,727 | 1/1977 | Sonoda et al. | 423/244 |
| 4,246,242 | 1/1981 | Butler et al. | 423/242 R |
| 4,293,521 | 10/1981 | Isahaya et al. | 423/242 R |
| 4,293,524 | 10/1981 | Teller et al. | 423/242 R |

FOREIGN PATENT DOCUMENTS

| | | | |
|---|---|---|---|
| 597254 | 1/1948 | United Kingdom | 423/242 |
| 1078596 | 8/1967 | United Kingdom | 423/244 |
| 1568916 | 6/1980 | United Kingdom | 423/242 |
| 1576524 | 10/1980 | United Kingdom | 423/244 |

OTHER PUBLICATIONS

Uno et al., "Scale-Up of a SO₂ Control Process", Chemical Engineering Progress, vol. 66, No. 1, Jan. 1970.

Primary Examiner—Andrew H. Metz
Assistant Examiner—Terryence Chapman
Attorney, Agent, or Firm—Banner, Birch, McKie & Beckett

[57] ABSTRACT

A process and apparatus for removing total reduced sulfur compounds (TRS), especially H₂S and mercaptans from industrial gases is disclosed wherein an aqueous suspension of an active manganese dioxide is contacted with the industrial gas by atomizing the aqueous suspension in a spray dryer and contacting the atomized droplets with the industrial gas at a temperature sufficient to substantially completely evaporate the water in the atomized droplets. In preferred practice, the dried powder produced by the spray dry process is recovered as a particle layer in a bag filter unit through which the industrial gas is caused to flow.

25 Claims, 4 Drawing Figures

PROCESS FOR REMOVING TOTAL REDUCED SULFUR COMPOUNDS FROM INDUSTRIAL GASES USING MANGANESE DIOXIDE

BACKGROUND OF THE INVENTION

1. Field of the Invention

The present invention relates to a process and apparatus for the removal of Total Reduced Sulfur compounds (TRS), especially $H_2S$ and mercaptans, from industrial gases. More particularly, the present invention relates to a spray dryer absorption process employing an aqueous manganese dioxide suspension as an oxidative absorbent and preferably involves enhanced absorption by including a bag filter unit downstream of the spray dryer absorber.

2. Description of the Prior Art

Various processes have been proposed for reducing the content of sulfur compounds in industrial waste gases. Most of these processes relate to the removal of sulfur oxides. Because of their substantial acidic character, these sulfur oxides are readily absorbed by alkaline absorbents. Unfortunately, the same absorbents are not generally satisfactory for removing a number of important industrial byproduct sulfur compounds such as hydrogen sulfide, mercaptans and other organic sulfur containing compounds, since the acidic character of these compounds is generally much less pronounced. This is particularly true of the mercaptans for which there is no effective removal process being used commercially.

In British patent specification No. 1,576,534 a process for removing hydrogen sulfide from a hot reducing gas is disclosed. The process uses an absorbent comprising a mixture of finely divided manganese oxide, i.e., manganese of oxidation state 2, and finely divided aluminum oxide. Both the absorption and regeneration steps of the patented process require gas temperatures substantially higher than those typically encountered in industrial applications, for example, in pulping mills. Furthermore, a hot sulfur oxide-containing gas is produced by the disclosed high temperature regeneration technique, creating additional disposal problems in many cases. Moreover, it does not appear that the absorbent can remove mercaptans from gas streams.

U.S. Pat. No. 3,898,320 to Atsukawa uses a dry, powdered absorbent comprising a hydrated manganese oxide to remove sulfur oxides from gas streams. As described, the sulfur oxides in the gas react with the hydrated manganese oxide absorbent to produce manganese sulfate. The manganese sulfate is subsequently solubilized in water, converted to manganese hydroxide in the presence of ammonium hydroxide and is thereafter reconverted to the hydrated absorbent by oxidation with an oxygen-containing gas. The oxidation is conducted by bubbling the oxygen-containing gas through an aqueous dispersion of the manganese hydroxide. As in the prior process, there is no indication that this absorbent can be used to remove $H_2S$ or organic sulfur compounds, particularly mercaptans.

U.S. Pat. No. 3,492,083 to Lowicki, et al., describes a process for removing sulfur containing compounds including $H_2S$ and organic sulfur compounds which employs a complex multicomponent absorbent. This absorbent includes a metal oxide, hydrated oxide or hydroxide or preferably mixtures thereof, for example, manganese dioxide and magnesium oxide, in combination with an alkali metal or alkaline earth metal oxide or hydroxide, for example, sodium hydroxide. The absorption process is conducted at a relatively low temperature but an oxidic roasting at an elevated temperature above at least about 750° C. is required to regenerate the absorbent. As in the prior British patent, problems with disposing a high temperature regeneration gas containing sulfur dioxide are created in many cases.

It is an object of the present invention to provide a process and apparatus for efficiently removing $H_2S$ and organic sulfur-containing compounds, and particularly mercaptans, from industrial gas streams.

It is another object of this invention to provide a process and apparatus for removing the aforementioned sulfur compounds from industrial gas streams that permits a smooth and continuous operation suitable for automation.

It is a further object of this invention to provide a process for removing these sulfur compounds from industrial gas streams which employs a readily available absorbent that can be simply and efficiently regenerated by ambient temperature oxidation procedures.

SUMMARY OF THE INVENTION

These and other objectives which will readily occur to those skilled in the art are achieved by the present invention which comprises a process for removal of Total Reduced Sulfur compounds from an industrial gas comprising the steps of:

(a) preparing an aqueous feed suspension comprising an activated manganese dioxide absorbent;

(b) atomizing said feed suspension in a spray dryer to form fine droplets of said suspension and contacting the atomized droplets with a stream of said industrial gas at an elevated temperature in said spray dryer to effect oxidation of said Total Reduced Sulfur compounds and absorption of Total Reduced Sulfur compound oxidation products on said absorbent while simultaneously drying said atomized droplets to produce a dry powder comprising particles of unreacted manganese dioxide containing areas of reduced manganous compounds, whereby the content of the Total Reduced Sulfur compounds in said industrial gas is lowered;

(c) recovering said dry powder produced in said dryer;

(d) resuspending at least a part of the dry powder recovered in step (c) in water to produce an aqueous regeneration suspension;

(e) subjecting at least the aqueous portion of said regeneration suspension to liquid phase oxidation to regenerate an activated manganese dioxide absorbent; and (f) recycling the activated manganese dioxide absorbent produced in step (e) for use in the preparation of said aqueous feed suspension of step (a).

The present invention also provides a process for the removal of Total Reduced Sulfur compounds from an industrial gas comprising the steps of:

(a) preparing an aqueous feed suspension comprising an activated manganese dioxide absorbent which has been subjected to at least one reduction/oxidation cycle;

(b) atomizing said feed suspension in a spray dryer to form fine droplets of said suspension and contacting the atomized droplets with a stream of said industrial gas at an elevated temperature in said spray dryer to effect oxidation of said Total Reduced Sulfur compounds and absorption of Total Reduced Sulfur compound oxidation products on said absorbent while simultaneously drying said atomized droplets to produce a dry powder comprising particles of unreacted manganese dioxide containing areas of reduced manganous compounds, whereby the content of Total Reduced Sulfur compounds in said industrial gas is lowered;

(c) recovering from said spray dryer a scrubbed gas stream having at least a portion of said dry powder entrained therein;

(d) recovering any dry powder not entrained in said scrubbed gas stream directly from said spray dryer;

(e) forwarding said scrubbed gas stream to a bag filter collector and therein separating said dry powder from said scrubbed gas stream, said dry powder forming a layer of absorbent material on the filter surface whereby further removal of Total Reduced Sulfur compounds from the scrubbed gas stream is effected;

(f) recovering said portion of dry powder from said bag filter collector;

(g) resuspending at least a part of the dry powder recovered in steps (d) and/or (f) in water to produce an aqueous regeneration suspension;

(h) subjecting at least the aqueous portion of said regeneration suspension to liquid phase oxidation to regenerate an activated manganese dioxide absorbent; and (i) recycling the activated manganese dioxide absorbent produced in step (h) for use in the preparation of said aqueous feed suspension of step (a).

In another embodiment the present invention also comprises a process for removal of Total Reduced Sulfur compounds from an industrial gas comprising the steps of:

(a) preparing an aqueous feed suspension comprising an activated manganese dioxide absorbent;

(b) atomizing said feed suspension in a spray dryer to form fine droplets of said suspension and contacting the atomized droplets with a stream of said industrial gas at an elevated temperature in said spray dryer to effect oxidation of said Total Reduced Sulfur compounds and absorption of Total Reduced Sulfur compound oxidation products on said absorbent while simultaneously drying said atomized droplets to produce a dry powder comprising particles of unreacted manganese dioxide containing areas of reduced manganous compounds, whereby the content of Total Reduced Sulfur compounds in said industrial gas is lowered;

(c) recovering said dry powder produced in said spray dryer;

(d) providing an aqueous regeneration medium by supplying a flow of oxygen-containing gas through said aqueous medium;

(e) adding to said aqueous regeneration medium at least a part of the dry powder recovered in step (c) or an aqueous extract thereof;

(f) after the oxygen-containing gas flow of step (d) has begun, maintaining, by alkaline material addition if necessary, the pH in said regenerating medium at an alkaline level sufficient to produce an activated manganese dioxide absorbent;

(g) continuing the flow of said oxygen-containing gas through the alkaline regenerating medium for a period sufficient to regenerate an activated manganese dioxide absorbent; and (h) recycling the activated manganese dioxide absorbent produced in step (g) for use in the preparation of said aqueous feed suspension of step (a).

The present invention also contemplates an apparatus for the removal of Total Reduced Sulfur compounds from an industrial gas comprising:

(a) a mixing tank for preparing an aqueous feed suspension comprising an activated manganese dioxide absorbent;

(b) a spray dryer-absorber in communication with said mixing tank and having means for atomizing said feed suspension to form fine droplets of said suspension, at least one inlet for admitting said industrial gas from which said Total Reduced Sulfur compounds are to be removed, and an outlet for scrubbed waste gas of lower Total Reduced Sulfur compound content and entrained particles, said spray dryer absorber adapted to effect contact of the atomized droplets with said stream of industrial gas in such a manner as to produce a dry powder comprising particles of unreacted manganese dioxide containing areas of reduced manganous compounds;

(c) collector means for collecting said dry powder produced in said spray dryer absorber;

(d) means for resuspending at least a part of the dry powder recovered in step (c) in water to produce an aqueous regeneration suspension;

(e) means for subjecting at least the aqueous portion of said regeneration suspension to liquid phase oxidation to regenerate an activated manganese dioxide absorbent; and (f) means for recycling the activated manganese dioxide absorbent to said mixing tank.

BRIEF DESCRIPTION OF THE DRAWINGS

The exact nature of the present invention, as well as the objects and advantages thereof, will be more readily apparent from the following specification in connection with the attached drawings in which.

DESCRIPTION OF THE INVENTION

Figure 1:
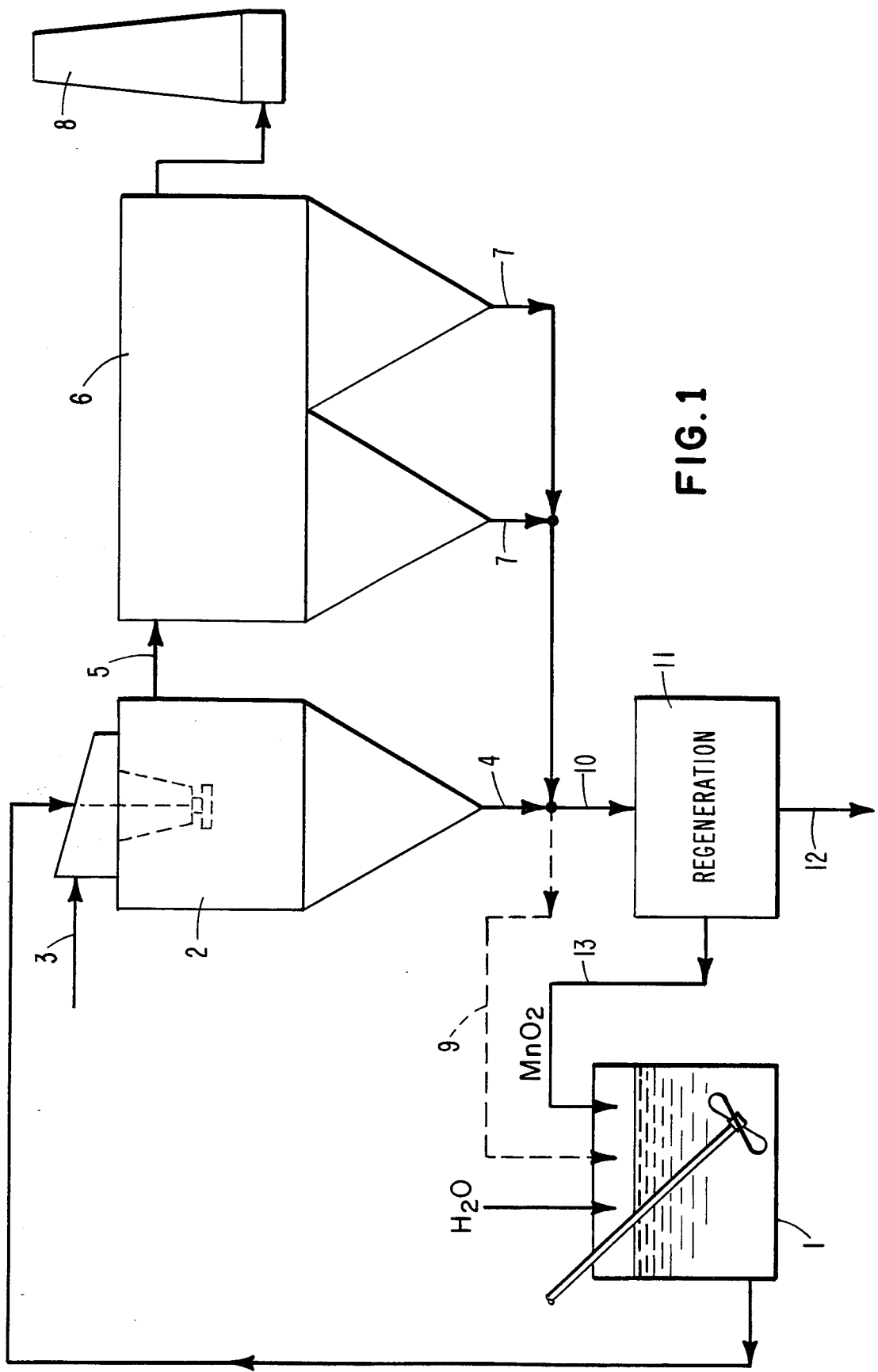
FIG. 1 is a general schematic flow diagram showing the process of this invention.

As used in the specification and claims, the term "industrial gas" refers to gases produced as products or byproducts in industrial processing facilities including, for example, waste gases from pulping mills, petroleum refineries, and other chemical manufacturing and refining installations.

The term "Total Reduced Sulfur compounds" herein refers in general to sulfur compounds having no substantial acidic character and includes, inter alia, $H_2S$, mercaptans such as methyl mercaptan, butyl mercaptan and the like, organic sulfides such as dimethyl sulfide, dimethyl disulfide, dimethyl sulfoxide and similar materials including homologs of the foregoing. These Total Reduced Sulfur (TRS) compounds are typically toxic and/or ordorous contaminants of various industrial gases which must be at least partially removed before releasing the gases into the environment or before the gases can be used for other purposes.

The terms "manganese dioxide" or "MnO$_2$" as used in the specification and claims refer to both naturally occurring forms, i.e., ores and synthetic forms of this compound. In addition, "MnO$_2$" materials employed as virgin starting material or as regenerated materials can have an oxygen content below exact stoichiometric amounts, i.e., slightly less than 2. Moreover, it is to be understood that the formula and term also cover compounds which may be hydrated. For convenience, all these MnO$_x$ materials are simply referred to as MnO$_2$ or manganese dioxide.

As used herein, the terms "spray dryer" or "spray dryer absorber" refer to the technically sophisticated process of atomizing (in the form of finely divided droplets) a solution or slurry into a hot gas stream under controlled temperature conditions and under specific gas/liquid contacting conditions to effect evaporation of water from the atomized droplets and production of a dry particulate product.

Spray drying as used herein is typically carried out with pressure nozzles or centrifugal atomizers operating at speeds of up to 10,000 to 16,000 RPM or more. At these speeds, one milliliter of liquid feed can be converted to over 100 million fine droplets. Despite this high velocity generation of droplets, the spray dryer is designed so that the droplets do not contact the spray dryer wall under proper operating procedures. This effect is achieved by a precise balance of atomizer velocity, air flow, spray dryer dimensions of height and diameter, and inlet and outlet means to produce a cyclonic flow of air in the chamber. This highly specialized art is clearly to be distinguished from the random and promiscuous spraying of liquid droplets such as one might do with a garden hose.

The basic starting material employed in the process of the present invention is the MnO$_2$ absorbent. In order to be useful in the absorption process it is necessary that the MnO$_2$ employed be activated. Some sources of MnO$_2$ by either their nature or their method of production possess this activity without special treatment. In many cases, however, it is necessary to perform an activation step prior to use of the MnO$_2$ as an absorbent for TRS compounds. According to the present invention, this activation is preferably accomplished by subjecting the non- or partially-active MnO$_2$ to at least one reduction/oxidation cycle. While this redox cycle treatment can, of course, be effected as a separate absorbent preparation step, it is preferred to utilize hereinafter-described regeneration steps of the present invention to effect or enhance the activation of the absorbent. Using this approach, the recycled regenerated material is in effect activated by reduction in the spray dryer absorber and oxidation in the regeneration step. It has also been found that the activity of some MnO$_2$ starting material or unregenerated recycle MnO$_2$ (as described hereinafter) may be increased by merely washing the absorbent with water. This may have the effect of removing interfering water-soluble salts on the surface of the insoluble MnO$_2$ materials. While initial activities of various MnO$_2$ materials may vary widely, the wet oxidative regeneration step of the present invention results in high activity for most MnO$_2$ materials. This discovery forms an important aspect of the present invention.

In the first step of the process of the present invention an aqueous feed suspension comprising an activated MnO$_2$ absorbent is prepared. As shown in FIG. 1, water and an MnO$_2$ material from direct recycle or regenerated recycle (as described later) are combined with agitation in mixing tank 1. The relative proportion of water to solids in this feed suspension is selected with regard to the temperature and humidity of the gas to be cleaned as described hereinafter. In general, the aqueous feed suspension will have a MnO$_2$ solids content of from about 2% to 70% by weight. Under typical gas conditions, a suspension having an MnO$_2$ solids content of from about 10% to 65% by weight is preferred. In the case of scrubbing waste gasses from a Kraft pulping mill, the preferred solids content is about 20% to 30%.

The aqueous feed suspension may also contain an alkaline material such as sodium carbonate, sodium hydrogen carbonate, sodium hydroxide, or the like, including mixtures thereof. It has been found that the later-described absorption step proceeds more efficiently when an alkaline material is present in the aqueous feed suspension. In general, the alkaline material can be added in an amount of from about 1% to 10% by weight based on the total weight of the suspension. Preferred are alkaline additions of from about 1% to 3%. As described below, certain industrial gases may have significant quantities of alkaline particulates entrained therein.

From the mixing tank 1, the aqueous feed suspension is forwarded to a spray dryer absorber 2 of a construction well known in the art. The spray dryer absorber is provided with means for atomizing the feed suspension in the form of fine droplets such as a rotary, abrasion resistant atomizer wheel or one or more atomizing nozzles.

Also fed into the spray dryer absorber is the hot industrial gas stream 3. This gas stream is the industrial gas described above contaminated with TRS compounds. The gas inlet temperature must be sufficiently high to yield substantially complete evaporation of the water in the atomized droplets. If the industrial gas stream is not supplied at the proper temperature, means known in the art can be provided for heating this gas prior to entry into the spray dryer absorber. In general, a gas inlet temperature in the range of from about 120°–300° C. is suitable. The preferred inlet temperature range is from about 200°–300° C. The industrial gas typically can have contaminate levels of TRS compounds of at least 10 ppm and preferably at least about 500 and can range up to 1,000 ppm or more, depending on the source. In addition to the gaseous contaminants, many industrial gas streams may also contain particulate materials such as alkaline dust or other fly ash type particulates. The presence of such materials does not prevent the oxidation of the present invention but as described later, certain alternative processing steps may be required. The gas flow rate through the spray dryer absorber can vary noncritically depending on the nature of the apparatus employed and the conditions of operation. Typically, gas flow rates will depend somewhat on the nature of the collection device employed downstream thereof. In general, higher flow rates are used when the collector is a bag house than when a cyclone is used as the collector.

In the spray dryer absorber, the hot industrial gas stream and the atomized droplets of aqueous feed suspension are contacted in such a way that the droplets are completely dried while at least a part of the TRS compounds are simultaneously removed from the gas by MnO$_2$ oxidation and absorption on the MnO$_2$ particles. This gas/slurry contact can be effected in a number of known ways. Typically, the spray dryer is adapted to atomize the feed slurry into a stream of gas which is moving in a co-current or countercurrent direction with respect to the atomized slurry.

In order to obtain a satisfactory absorption while simultaneously ensuring a sufficient drying of the atomized suspension, it is necessary to adjust the solids content, the droplet size and the feed rate of the aqueous slurry such that the temperature of the gas leaving the absorber is between 5° C. and 50° C. above its adiabatic saturation temperature (i.e., dew point), and preferably between 15° C. and 40° C. above adiabatic saturation. Besides yielding maximum absorption efficiency, this condition will also ensure that the stack gas has sufficient buoyancy to disperse in the atmosphere. As indicated above, the feed rate should also be adjusted to insure that there is no substantial contact of the atomized spray liquid and the wall of the spray dryer chamber.

The product formed in the spray dryer absorber is a dry powder which comprises unreacted $MnO_2$ particles having areas of reduced manganous compounds, i.e., the TRS oxidation products. The exact nature of all reactions taking place in the spray dryer absorber is not completely known and will, of course, vary with the nature of the industrial gas. In general, however, sulfur containing compounds are converted (oxidized) to sulfates or sulfonates while the $MnO_2$ is reduced to lower valence ions, i.e., $Mn^{++}$.

The next step of the process is the recovery of the dry powder produced in the spray dryer-absorber. This can be accomplished in several ways. In the embodiment shown in FIG. 1, a portion of the dry powder is removed directly from the bottom of the spray dryer. The remaining portion of the dry powder product is carried out of the spray dryer as entrained particles in the scrubbed gas stream 5. This stream is fed to a collector unit 6 described below. In the collector unit, the remainder of the powder is separated from the gas stream, the former being recovered from the collector unit (line 7) and the latter being forwarded to stack 8 for discharge to the atmosphere. In the preferred manner of operation, all the dry powder product is recovered from the collector unit.

Collector unit 6 may comprise a cyclone, an electrostatic precipitator or a bag filter unit or baghouse. The preferred collector unit is a bag filter or baghouse. In the bag filter unit the dry powder produced in the spray dryer absorber forms a layer on the upstream surface of a gas permeable filter fabric through which layer all the gas that enters the unit is constrained to pass. As will be more particularly illustrated in the examples hereafter, this arrangement provides an extremely efficient contact between the gas and the manganese dioxide-containing powder due to lower void volume in the powder in the filter fabric than in the gas cloud in the absorber. As a result, surprisingly substantial further absorption of TRS compounds takes place in the bag filter unit, even in the absence of liquid $H_2O$.

The spent powder absorbent material collected in the bag filter collector unit 6 and removed therefrom through outlet 7, possibly together with absorbent material recovered through outlet 4, may be divided into two portions; the first of which is recycled through conduit 9 to mixing tank 1. The remaining portion of the absorbent material is passed through conduit 10 to an oxidative regeneration section 11, which, within the scope of the present invention, may comprise various operations. Alternatively, the total amount of absorbent material recovered through outlets 4 and 7 may be passed to the regeneration section.

Regeneration generally is effected by liquid phase oxidation of $Mn^{++}$ compounds resulting from the reactions taking place in the spray dryer absorber. The products of regeneration include an insoluble reactivated $MnO_2$-containing stream 12 and stream 13 containing soluble sulfur-containing compounds which can be removed (bled) from the system by separating all or a part of the aqueous regeneration products.

Among the suitable liquid phase oxidation techniques are electrolytic oxidation (i.e., oxidation by nascent oxygen) and treatment with various oxidizing agents such as oxygen-containing gases (e.g., air), ozone, peroxides, persulfates, permanganates, hypochlorites, perchlorates, hypochlorates, and the like. Preferably, these techniques are carried out at ambient temperatures although somewhat higher or lower temperatures may be employed as long as the liquid system is not adversely affected, e.g., by boiling or freezing.

In general, there are two basic procedures for effecting this liquid phase oxidative regeneration. As indicated above, the dry powder comprises unreacted $MnO_2$ having areas of reduced Mn values, possibly as $Mn^{++}$ salts. The first and most preferred approach is to resuspend this powder in water and subject the entire suspension to oxidation. While not wishing to be bound to any particular theory, applicants believe that oxidation of $Mn^{++}$ values may take place at or on the surface of the unreacted $MnO_2$ particles and/or in the aqueous phase due to solubilization (extraction) of these values. In any event, the regeneration of $MnO_2$ from $Mn^{++}$ values is best accomplished by oxidizing the complete aqueous resuspension (possibly containing both absorbed and extracted $Mn^{++}$ values). In an alternative embodiment, it is possible to rely solely on extraction to provide $Mn^{++}$ values for regeneration, in which case, the aqueous resuspension can be separated (e.g., by filtration decantation, etc.) into a solid unreacted $MnO_2$ fraction and an aqueous fraction and only the aqueous fraction subject to oxidation of the type described above. In either case, the solubilized sulfur containing salts can be removed from the system by bleeding out all or a portion of the aqueous phase.

An important advantage of the process of the present invention is the ability to bleed off the soluble oxidation products (i.e., sulfates, sulfonates, sulfinates and the like) and the resulting elimination of the counterproductive need to regenerate the oxide by high temperature heating. In the context of paper mill gas effluent treatment, some part of the bleed-off solution from the regeneration of manganese dioxide can be sent to the recovery boiler where it will be converted into sodium sulfate suitable for reuse in the pulping process. This bleeding or partial dewatering can be effected by a number of techniques which include, inter alia, sedimentation, wet cycloning, centrifuging, filter pressing and the like.

Both of the above-described approaches will now be described in connection with the preferred type of oxidative regeneration—that employing an oxygen-containing gas (e.g., air) as the oxidizing agent.

The preferred embodiment of this procedure is illustrated in FIG. 2. An oxidizing vessel 14 is provided with means for aerating the contents thereof with an oxygen-containing gas. Air will generally be used because of economic considerations. Although nozzles 15 are illustrated as the means for introducing the gas into vessel 14, other means including aerators of the surface or submerged variety may also be used. Such aerating means are well known to one skilled in the art.

The next step involves adding the dry powder 10 to this aerated aqueous medium (i.e., resuspending the powder). An important feature of this preferred regeneration procedure is the establishment of a well-aerated aqueous medium in vessel 14 before the powder absorbent material to be regenerated is introduced thereto.

Another parameter which appears important in this preferred regeneration scheme is the pH of the aerated aqueous medium. The oxidative regeneration is based primarily on the following overall reaction:

$$2Mn^{++} + O_2 + 4OH^- \rightarrow 2MnO_2 + 2H_2O$$

While not wishing to be bound to any particular theory, it is believed that this overall reaction actually proceeds via the precipitation of an intermediate $Mn(OH)_2$ which in turn is oxidized to $MnO_2$. This reaction via $Mn(OH)_2$ proceeds most efficiently under alkaline pH conditions. While the exact pH necessary to effect production of an activated $MnO_2$ absorbent (e.g., by $Mn(OH)_2$ precipitation) can vary widely dependent on the nature of the absorbent and its concentration in the slurry, in general, the slurry pH should be adjusted (unless already alkaline) to a value of at least 7 or above and preferably in the range of from about 9 to 12.5. The proper pH for any particular regeneration system can be determined experimentally. If the pH is too low or too high, an active $MnO_2$ is not produced.

Since the above reaction indicates a consumption of hydroxide ions, it may be necessary to provide for a continuous addition of alkali to the vessel 10 as indicated by the dotted line 16. However, since a sufficient amount of alkali will often be present in the material to be regenerated through line 10, the addition of further alkaline material may not be necessary.

The proposed $Mn(OH)_2$ intermediate reaction route is also primarily responsible for the requirement of starting the flow of oxygen-containing gas at the very beginning of the regeneration process. It has been found that sufficient oxygen must be present at the very moment of formation of insoluble $Mn(OH)_2$ precipitate so it can be immediately oxidized to $MnO_2$. If $Mn(OH)_2$ is allowed to age before oxidation takes place, crystallization of the hydroxide will occur making oxidation to an active form of $MnO_2$ difficult or impossible.

As noted before, a particularly advantageous feature of the present invention is that the oxidative regeneration can be performed at ambient temperatures and at average residence times on the order of a few hours. The regeneration may be performed in a batchwise fashion or as a continuous process.

When substantially all of the manganous compounds have been converted into an activated manganese dioxide, the resulting suspension may be passed to a separator 17, for example, a sedimentation vessel, a centrifuge, or a filter. In the separator, some or all of the aqueous solution can be removed through conduit 18. Since the primary purpose of this separator is to bleed off soluble sulfur containing compounds, it may not be necessary to utilize separator 17 until intolerable levels of these compounds build up in the cyclic system.

The manganese dioxide recovered from the separator 17 is then recycled to the mixing tank 1 as shown in FIG. 1 for preparation of the aqueous feed suspension of activated manganese dioxide. The manganese dioxide produced in the regeneration step by oxidation of manganous ions possesses an activity for the absorption of TRS compounds on the same level as the most efficient manganese dioxide materials commercially available.

Figure 3:
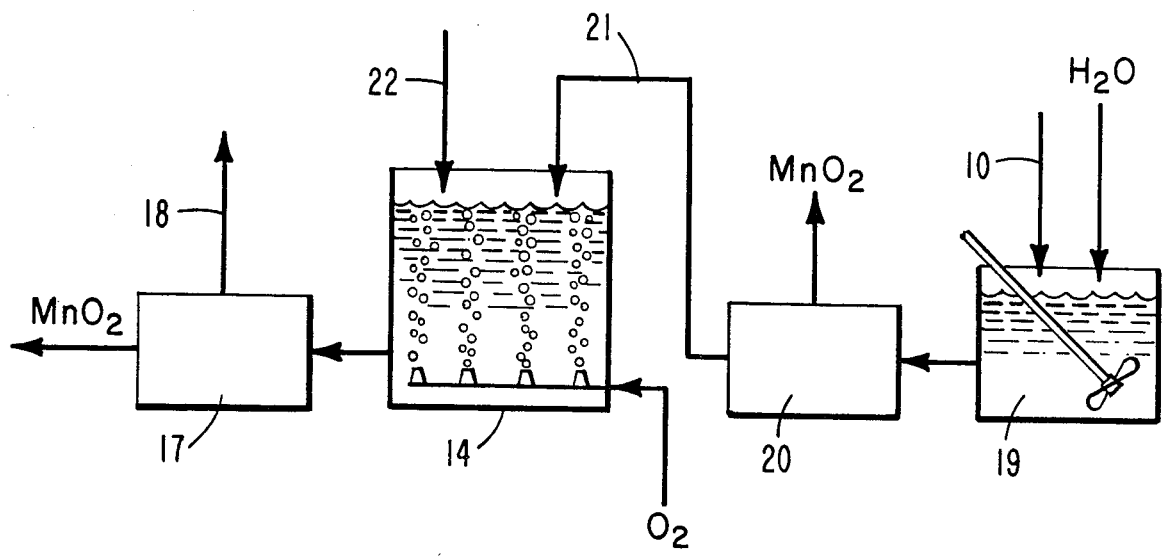
FIG. 3 is a schematic flow diagram depicting an alternative embodiment of the regeneration procedure.
Figure 4:
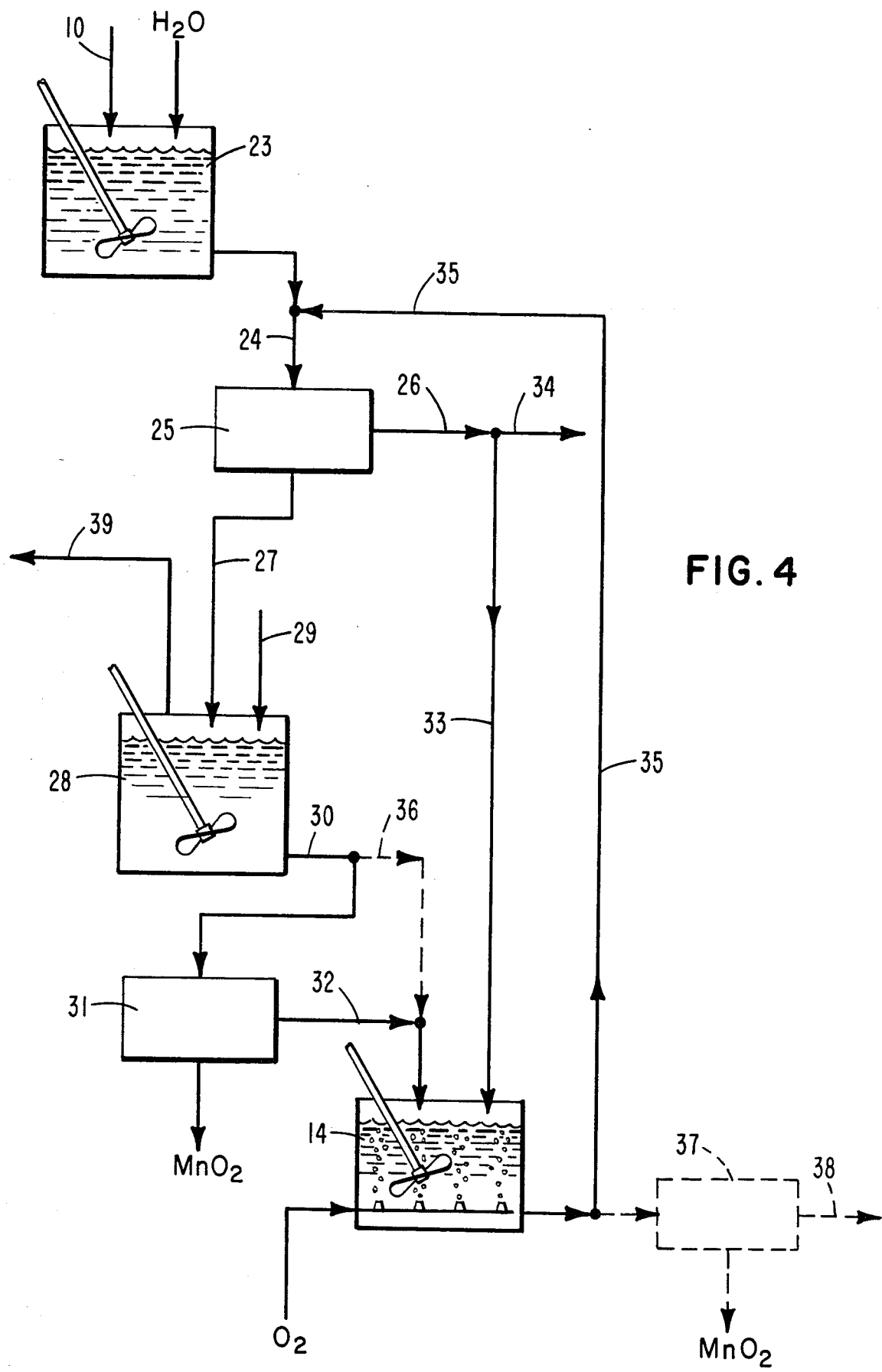
FIG. 4 is a schematic flow diagram showing a further embodiment of the regeneration procedure suitable when the gas to be treated contains substantial amounts of particulate alkaline material.

An alternative approach to regeneration is illustrated in FIGS. 3 and 4. This approach is based generally on the regeneration of an aqueous extract of the dry powder produced in the spray dryer. The differences between the embodiments of FIGS. 3 and 4 are to accommodate different types of feed materials. When the dry powder resulting from the spray dryer absorber has only a low content of highly basic components, the scheme of FIG. 3 can be used. However, when the gas to be treated has substantial amounts of entrained alkaline dust or the aqueous feed suspension contains highly basic additives, e.g., NaOH, the embodiment of FIG. 4 should be used.

Referring to FIG. 3, the material to be regenerated 10 is mixed with water in tank 19, i.e., the dry powder is resuspended to form an aqueous regeneration suspension. The suspension is forwarded to a separator 20, e.g., a centrifuge setting vessel or cyclone, in which the solids ($MnO_2$) are recovered for recycling to mixing tank 1. The aqueous extract solution 21 is then added to an aerated aqueous medium in vessel 14 as described above. Thereafter, a basic solution, such as an aqueous sodium carbonate solution, is added to the aeration vessel through line 22. This results in simultaneous precipitation and oxidation of the manganous ions to give an active $MnO_2$ product. The remainder of the regeneration process proceeds as described in connection with FIG. 2.

If the TRS compound-containing gas also contains considerable amounts of alkaline materials, as might be the case when the gas is a waste gas originating from the regeneration furnaces of a pulping mill, the embodiment of FIG. 4 can be used for regeneration of the spent absorbent. The waste gases from pulping mills generally contain sodium carbonate and sodium sulfate as fine particles, which are not easily removed before the gas is subjected to the cleaning procedures according to this invention. This means that a substantial amount of sodium carbonate and other alkaline materials will be present in the dry powder material delivered through conduit 10. If such a material is subject to the regeneration treatment described in connection with FIG. 2, it appears that the formation of such manganous compounds as manganous hydroxide and manganous carbonate takes place before the oxidation required to yield active manganese dioxide can occur. Indeed, even prolonged contact with the oxygen-containing gas will not transform these compounds into a product having sufficient activity in the spray drying absorption process. Therefore, regeneration of spent absorbent having a high alkali content preferably takes place as illustrated in FIG. 4.

In FIG. 4 is shown a mixing tank 23 into which the absorbent material to be regenerated is introduced through line 10 and is mixed with water to form an aqueous regeneration suspension therein. The suspension 24 is conducted to a separator 25 and separated into an aqueous phase 26 and a thickened slurry of the absorbent material 27. At this point the slurry may have a pH exceeding 10.

The thickened slurry of absorbent material 27 is fed to a treatment tank 28 in which it is treated with a diluted acid, preferably sulfuric acid, introduced through conduit 29 to effect dissolution (extraction) of manganous values not extracted in the aqueous resuspension step. Adjusting the slurry to a pH of generally less than about 4 has been found to be suitable to accomplish this result. Since minor amounts of hydrogen sulfide may be generated by this procedure, venting means 39 are provided for venting any gases released in tank 28 to a location upstream of the spray dryer absorber 2.

The acidified slurry 30 containing undissolved $MnO_2$ is forwarded to separator 31 where $MnO_2$ is recovered. The aqueous $Mn^{++}$ acid extract 32 is thereafter supplied to oxidation vessel 14 operating as described in connection with FIG. 2. The alkaline extract medium from separator 25 is added to oxidizng tank 14 via conduit 33, after partial purge of this line, if desired, shown at 34.

The activated $MnO_2$ suspension produced in oxidation vessel 14 can be recycled via line 35 to conduit 24 resulting in recovery of $MnO_2$ from separator 31. In this scheme any insoluble manganous compounds not oxidized in vessel 14 will be dissolved in tank 28 and thereby recycled to oxidation tank 14.

In an illustrated alternative embodiment shown in dotted lines on FIG. 4, the acidified slurry fron tank 28 is fed directly to vessel 14 via line 36. In this approach the $MnO_2$ solids are fed to the oxidizer along with the alkaline and acidic extract products. Instead of using recycle line 35, the $MnO_2$ solids can be recovered in separator 37.

The recovered aqueous phase 38 may be purged of if desired in part utilized in the preparation of the aqueous feed suspension in tank 1, or used as a supplemental alkaline material for addition to oxidation vessel 14. In addition to the alkaline solution introduced through line 33 (or 38), the oxidation tank 14 may also receive basic materials from other sources (not shown) if required for adjusting the alkalinity.

The following examples are intended to illustrate more fully the nature of the present invention without acting as a limitation on its scope.

EXAMPLE 1

In this example, the effectiveness of the process of the present invention in removing TRS compounds from a hot gas stream is illustrated. This example particularly highlights the contribution of the bag filter unit in the overall absorption treatment system. The test system employed the general process arrangement of FIG. 1. A simulated hot gas stream, prepared by selectively doping an air stream with a desired level of contaminants, heated to various elevated temperatures and at a flow rate of about 100 kg/hr was introduced into a spray dryer having a diameter of 0.8 m, a cylindrical height of 0.6 m, and a tapered bottom. In certain tests, carbon dioxide was added to the simulated hot gas stream to observe its effect on absorption efficiency. The spray dryer was provided with a rotary atomizer wheel for atomizing the aqueous slurry into the hot gas stream.

Various feed slurries in terms of composition and total solids contents were tested so as to yield various weight ratios of manganese dioxide to TRS pollutant as well as to produce exit gas temperatures at various approaches to the adiabatic saturation temperature (dew point) of the gas. The TRS pollutant concentration of the outlet gas was measured both before and after the bag filter. The test results are illustrated in Tables 1 through 6. These tables also indicate the relevant test conditions.

The results vividly illustrate not only the excellent overall removal of TRS pollutants provided by the present invention, but also the unexpected degree to which the bag filter collector unit participates in the treatment process. Overall removal efficiencies between 90% and 100% were typically obtained.

TABLE 1

Inlet temperature: 215–245° C.
Absorbent: 20% Total Solids Slurry - 15% $MnO_2$
5% $NaHCO_3$
Weight ratio: $MnO_2/H_2S = 23$

| time (min) | inlet conc. ppm | conc. before BF, ppm | removal SDA, % | conc. after BF, ppm | removal BF % | total removal % | Tad °C. |
|---|---|---|---|---|---|---|---|
| 5 | 230 | 80 | 65 | 0 | 100 | 100 | 33 |
| 18 | 230 | 60 | 74 | 0 | 100 | 100 | 35 |
| 26 | 230 | 70 | 70 | 10 | 86 | 96 | 33 |
| 31 | 230 | 50 | 78 | 0 | 100 | 100 | 28 |
| 36 | 230 | 20 | 91 | 0 | 100 | 100 | 32 |
| 45 | 230 | 50 | 78 | 8 | 84 | 97 | 24 |
| 49 | 230 | 50 | 78 | 5 | 90 | 98 | 29 |
| 58 | 239 | 50 | 78 | 0 | 100 | 100 | 29 |
| 66 | 750 | 170 | 77 | 40 | 77 | 95 | 28 |
| 69 | 575 | 160 | 72 | 20 | 88 | 97 | 34 |

TABLE 2

Inlet temperature: 220° C.
Absorbent: 11.5% Total Solids Slurry - 8% $MnO_2$
3.5% $NaHCO_3$
Weight ratio: $MnO_2/H_2S = 11$

| time (min) | inlet conc. ppm | conc. before BF, ppm | removal SDA, % | conc. after BF, ppm | removal BF % | total removal % | Tad °C. |
|---|---|---|---|---|---|---|---|
| 7 | 230 | 60 | 74 | 2 | 97 | 99 | 36 |
| 20 | 230 | 70 | 70 | 1 | 99 | 99 | 37 |
| 25 | 230 | 80 | 65 | 8 | 90 | 97 | 40 |

TABLE 3

Inlet temperature: 230–270° C.
Absorbent: 14% Total Solids Slurry - 10% $MnO_2$
4% $NaHCO_3$
Weight ratio: $MnO_2/H_2S = 16$

| time (min) | inlet conc. ppm | conc. before BF, ppm | removal SDA, % | conc. after BF, ppm | removal BF % | total removal % | Tad °C |
|---|---|---|---|---|---|---|---|
| 22 | 230 | 180 | 22 | 20 | 89 | 91 | — |
| 36 | 230 | 140 | 40 | 20 | 86 | 91 | 50 |
| 50 | 230 | 90 | 61 | 10 | 89 | 96 | 46 |
| 80 | 230 | 100 | 57 | 10 | 90 | 96 | 50 |

TABLE 4

Inlet temperature: 210° C.
Absorbent: 18.5% Total Solids Slurry - 13.5% $MnO_2$
5% $NaHCO_3$
Weight ratio: $MnO_2/H_2S = 16$

| time (min) | inlet conc. ppm | conc. before BF, ppm | removal SDA, % | conc. after BF, ppm | removal BF % | total removal % | Tad °C |
|---|---|---|---|---|---|---|---|
| 23 | 230 | 60 | 74 | 2 | 97 | 99 | 28 |
| 60 | 230 | 40 | 83 | 2 | 98 | 99 | 32 |

TABLE 5

Inlet temperature: 215–240° C.
Absorbent: 11.7% Total Solids Slurry - All $MnO_2$
Weight ratio: $MnO_2/H_2S = 17$

| time (min) | inlet conc. ppm | conc. before BF, ppm | removal SDA, % | conc. after BF, ppm | removal BF % | total removal % | Tad °C |
|---|---|---|---|---|---|---|---|
| 10 | 230 | 160 | 30 | 140 | 13 | 39 | 34 |
| 40 | 230 | 130 | 44 | 100 | 23 | 57 | 32 |
| 100 | 230 | 180 | 22 | 100 | 44 | 57 | 34 |
| 130 | 230 | 155 | 33 | 70 | 55 | 70 | 35 |

TABLE 6

Inlet temperature: 220–225° C.
Absorbent: 22% Total Solids Slurry - 10% $MnO_2$
4% $Na_2CO_3$
8% $Na_2SO_4$
Weight ratio: $MnO_2/H_2S = 12$

| time (min) | inlet conc. ppm | conc. before BF, ppm | removal SDA, % | conc. after BF, ppm | removal BF % | total removal % | Tad °C |
|---|---|---|---|---|---|---|---|
| 20 | 250 | 120 | 52 | 20 | 83 | 92 | 42 |
| 30 | 250 | 100 | 60 | 20 | 80 | 92 | 45 |
| 38 | 250 | 110 | 56 | 30 | 73 | 88 | 46 |
| 41 | 250 | 100 | 60 | 40 | 60 | 84 | 46 |

EXAMPLE 2

The general procedures of Example 1 were repeated using a starting material manganese ore (pyrolusite) which was activated by the treatment with 10% (W/W) of a sodium hypochlorite solution containing 12.3% (W/W) active chlorine followed by washing with 3 volumes of water. Absorption results similar to those in Example 1 were observed.

EXAMPLE 3

This example demonstrates the use of an oxidizing agent such as sodium hypochlorite in the ambient temperature, liquid phase oxidative regeneration of spent $MnO_2$ absorbent. The spent $MnO_2$ was resuspended in water and was activated (oxidized) by treatment with 10% (W/W) of a sodium hypochlorite solution containing 12.3% (W/W) active chlorine. The recovered precipitate was washed with water and a suspension thereof was spray dried with a TRS-containing gas. Absorption results similar to those obtained in Example 2 were observed.

EXAMPLE 4

Figure 2:
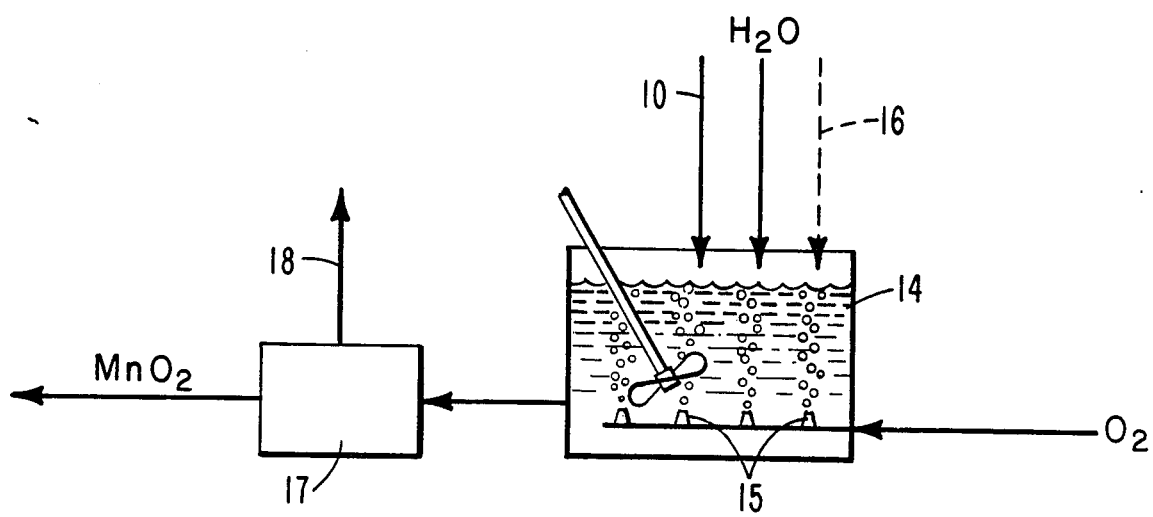
FIG. 2 is a schematic flow diagram illustrating the preferred embodiment for regeneration of the spent absorbent to be used in the process depicted in FIG. 1.

This example demonstrates the regeneration of spent $MnO_2$ absorbent employing the embodiment of FIG. 2. The spent $MnO_2$ was resuspended in water at a concentration of 10% solids. After mixing for thirty minutes, stirring was discontinued and the $MnO_2$ was allowed to settle over a three hour period. Thereafter, the clear supernatant solution containing soluble manganous ions was treated with 2% (W/W) sodium hypochlorite solution containing 15% (W/W) active chlorine. The resulting slurry was then mixed for about two hours, during which time a fine precipitate of $MnO_2$ formed. The resulting slurry was washed three times with water; the slurry was allowed to settle after each washing. The final slurry was then spray dried in the arrangement of FIG. 1 using a gas containing methyl mercaptan. Nearly complete removal of the mercaptan was obtained in the outlet flue gas.

EXAMPLE 5

This example demonstrates the regeneration of spent $MnO_2$ absorbent employing the embodiment of FIG. 3. Dry powder produced in the spray dryer absorber (see Example 1) and recovered from the bag filter was washed with water to form an aqueous extract solution containing soluble $Mn^{++}$ values. This extract solution was placed in an aerating vessel and the flow of air bubling through was started. The pH of the aerated aqueous medium was then adjusted to a value above 10-11. After about 16 hours the reaction was stopped, the mixture filtered. The black filter cake ($MnO_2$) was as active as the original material employed.

EXAMPLE 6

This example demonstrates the regeneration of spent $MnO_2$ absorbent employing the embodiment of FIG. 4. Dry powder (4.9 g) from the spray dryer absorber produced using an $MnO_2$ absorbent containing $NaHCO_3$ was treated with 100 ml. of a 10% (W/W) solution of $H_2SO_4$ at 50°-60° C. The suspension was filtered and the aqueous acid extracted containing $Mn^{++}$ was diluted to 300 ml. and placed in an aerating vessel. After the flow of air was established, 150 ml. of 1.2M NaOH were slowly added while stirring and a brown precipitate formed. After one hour the reaction was stopped and the mixture was filtered to recover a $MnO_2$ absorbent which proved to be as active as the original one.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A process for the removal of Total Reduced Sulfur compounds from an industrial gas comprising the steps of:
   (a) preparing an aqueous feed suspension comprising an activated manganese dioxide absorbent;
   (b) atomizing said feed suspension in a spray dryer to form fine droplets of said suspension and contacting the atomized droplets with a stream of said industrial gas, said gas at a temperature above 100° C. in said spray dryer to effect oxidation of said Total Reduced Sulfur compounds and absorption of Total Reduced Sulfur compound oxidation products on said absorbent while simultaneously drying said atomized droplets to produce a dry powder comprising particles of unreacted manganese dioxide containing areas of reduced manganous compounds, whereby the content of Total Reduced Sulfur compounds in said industrial gas is lowered;
   (c) recovering said dry powder produced in said spray dryer;
   (d) resuspending at least a part of the dry powder recovered in step (c) in water to produce an aqueous regeneration suspension;
   (e) subjecting at least the aqueous portion of said regeneration suspension to liquid phase oxidation to regenerate an activated manganese dioxide absorbent; and
   (f) recycling the activated manganese dioxide absorbent produced in step (e) for use in the preparation of said aqueous feed suspension of step (a).

2. A process for the removal of Total Reduced Sulfur compounds from an industrial gas comprising the steps of:
   (a) preparing an aqueous feed suspension comprising an activated manganese dioxide absorbent which has been subjected to at least one reduction/oxidation cycle;
   (b) atomizing said feed suspension in a spray dryer to form fine droplets of said suspension and contacting the atomized droplets with a stream of said industrial gas, said gas at a temperature above 100° C. in said spray dryer to effect oxidation of said Total Reduced Sulfur compounds and absorption of Total Reduced Sulfur compound oxidation products on said absorbent while simultaneously drying said atomized droplets to produce a dry powder comprising particles of unreacted manganese dioxide containing areas of reduced manganous compounds, whereby the content of Total Reduced Sulfur compounds in said industrial gas is lowered;
   (c) recovering from said spray dryer a scrubbed gas stream having at least a portion of said dry powder entrained therein;
   (d) recovering any dry powder not entrained in said scrubbed gas stream directly from said spray dryer;
   (e) forwarding said scrubbed gas stream to a bag filter collector unit and therein separating said dry powder from said scrubbed gas stream, said dry powder forming a layer of absorbent material on the filter surface whereby further removal of Total Reduced Sulfur compounds from the scrubbed gas stream is effected;
   (f) recovering said portion of dry powder from said bag filter collector unit;
   (g) resuspending at least a part of the dry powder recovered in steps (d) and/or (f) in water to produce an aqueous regeneration suspension;
   (h) subjecting at least the aqueous portion of said regeneration suspension to liquid phase oxidation to regenerate an activated manganese dioxide absorbent; and
   (i) recycling the activated manganese dioxide absorbent produced in step (h) for use in the preparation of said aqueous feed suspension of step (a).

3. A process for the removal of Total Reduced Sulfur compounds from an industrial gas comprising the steps of:
   (a) preparing an aqueous feed suspension comprising an activated manganese dioxide absorbent;
   (b) atomizing said feed suspension in a spray dryer to form fine droplets of said suspension and contacting the atomized droplets with a stream of said industrial gas, said gas at a temperature above 100° C. in said spray dryer to effect oxidation of said Total Reduced Sulfur compounds and absorption of Total Reduced Sulfur compound oxidation products on said absorbent while simultaneously drying said atomized droplets to produce a dry powder comprising particles of unreacted manganese dioxide containing areas of reduced manganous compounds, whereby the content of Total Reduced Sulfur compounds in said industrial gas is lowered;

(c) recovering said dry powder produced in said spray dryer;

(d) providing an aqueous regeneration medium by supplying a flow of oxygen-containing gas through said aqueous medium;

(e) adding to said aqueous regeneration medium at least a part of the dry powder recovered in step (c) or an aqueous extract thereof;

(f) after the oxygen-containing gas flow of step (d) has begun, maintaining, by alkaline material addition if necessary, the pH in said regenerating medium at an alkaline level sufficient to produce an activated manganese dioxide absorbent;

(g) continuing the flow of said oxygen-containing gas through the alkaline regenerating medium for a period sufficient to regenerate an activated manganese dioxide absorbent; and (h) recycling the activated manganese dioxide absorbent produced in step (g) for use in the preparation of said aqueous feed suspension of step (a).

4. The process of claims 1, 2 or 3 wherein said Total Reduced Sulfur compounds comprise hydrogen sulfide, mercaptans and mixtures thereof.

5. The process of claim 1, 2 or 3 wherein said aqueous feed suspension additionally comprises a dissolved alkaline component.

6. The process of claim 5 wherein said dissolved alkaline component is selected from the group consisting of sodium hydroxide, sodium hydrogen carbonate and sodium carbonate.

7. The process of claims 1, 2 or 3 wherein at least a part of said dry powder produced in said spray dryer is recycled directly for preparation of said aqueous feed suspension.

8. The process of claims 1, 2 or 3 wherein aqueous feed suspension comprises from about 2% to 70% by weight of manganese dioxide solids.

9. The process of claim 1, 2 or 3 wherein said industrial gas is admitted to said spray dryer at a temperature of from about 120° C. to 300° C.

10. The process of claim 1, 2 or 3 wherein the temperature of the gas leaving said spray dryer is maintained at a temperature of from about 5° C. to 50° C. above the adiabatic saturation temperature of said gas by adjusting the amount of water which is evaporated in the gas.

11. The process of claim 1 or 3 wherein a scrubbed gas stream having at least a portion of said dry powder entrained therein is recovered from said spray dryer and forwarded to a collector unit wherein said poriton of dry powder is separated from said scrubbed gas stream.

12. The process of claim 11 wherein all of the dry powder produced in said spray dryer is entrained in said scrubbed gas stream and subsequently recovered in said collector unit.

13. The process of claim 11 wherein a first portion of said dry powder produced in said spray dryer is recovered directly from said spray dryer, and a second portion of said dry powder is recovered from said collector unit.

14. The process of claim 11 wherein said collector unit comprises a bag filter in which said dry powder forms a layer of absorbent material on the filter surface to affect further removal of Total Reduced Sulfur compounds from the scrubbed gas stream.

15. The process of claim 2 wherein all of the dry powder produced in said spray dryer is entrained in said scrubbed gas stream and subsequently recovered in said collector unit.

16. The process of claim 2 wherein a first portion of said dry powder produced in said spray dryer is recovered directly from said spray dryer, and a second poriton of said dry powder is recovered from said collector unit.

17. The process of claim 1 or 2 wherein said liquid phase oxidation is effected employing an oxidizing agent selected from the group consisting of air, ozone, peroxides, persulfates, permanganates, hypochlorites, and mixtures thereof.

18. The process of claim 17 wherein said oxidation agent is passed through an aqueous regeneration medium to which the material to be regenerated is subsequently added.

19. The process of claim 18 wherein said oxygen-containing gas is air.

20. The process of claim 3 wherein said oxygen-containing gas is air.

21. The process of claim 3 wherein at least a part of said dry powder produced in said spray dryer is added directly to said aqueous regeneration medium.

22. The process of claim 3 wherein an aqueous extract of said dry powder is added to said aqueous regeneration medium, said aqueous extract being prepared by resuspending at least a portion of said dry powder produced in said spray dryer in water and thereafter separating insoluble unreacted manganese dioxide from this aqueous solution.

23. The process of claim 22 wherein said aqueous extract preparation includes the step of employing an acid to dissolve water-insoluble manganous compounds.

24. The process of claim 23 wherein said acid comprises sulfuric acid.

25. The process of claims 1, 2 or 3 wherein at least a portion of the liquid regeneration solution containing dissolved oxidation products is separated from said activated manganese dioxide absorbent prior to said recycling the absorbent for use in preparation of the aqueous feed suspenion.

* * * * *